United States Patent
Ura (10) Patent No.: US 9,250,068 B2
(45) Date of Patent: Feb. 2, 2016

(54) ROTATION ANGLE DETECTING DEVICE

(71) Applicant: JTEKT CORPORATION, Osaka-shi, Osaka (JP)

(72) Inventor: Noritake Ura, Anjo (JP)

(73) Assignee: JTEKT CORPORATION, Osaka-shi (JP)

( * ) Notice: Subject to any disclaimer, the term of this patent is extended or adjusted under 35 U.S.C. 154(b) by 288 days.

(21) Appl. No.: 13/909,380

(22) Filed: Jun. 4, 2013

(65) Prior Publication Data

US 2013/0326888 A1 Dec. 12, 2013

(30) Foreign Application Priority Data

Jun. 11, 2012 (JP) ................... 2012-132086

(51) Int. Cl.
| G01C 1/00 | (2006.01) |
| G01D 3/08 | (2006.01) |
| G01D 5/20 | (2006.01) |

(52) U.S. Cl.
CPC .. G01C 1/00 (2013.01); G01D 3/08 (2013.01); G01D 5/2013 (2013.01)

(58) Field of Classification Search
CPC ........................................ G01C 1/00
USPC ............................................ 33/1 N
See application file for complete search history.

(56) References Cited

U.S. PATENT DOCUMENTS

| 7,603,250 | B2 * | 10/2009 | Nishimoto et al. ........... 702/151 |
| 8,558,534 | B2 * | 10/2013 | Tomita .................. 324/76.77 |
| 8,781,777 | B2 * | 7/2014 | Satou et al. ....................... 702/94 |
| 8,798,958 | B2 * | 8/2014 | Satou et al. .................. 702/151 |
| 2003/0074799 | A1 * | 4/2003 | Nakano et al. .................. 33/1 N |
| 2004/0017206 | A1 | 1/2004 | Ura |
| 2005/0135035 | A1 * | 6/2005 | Tsutsui ........................ 361/93.1 |
| 2008/0284366 | A1 | 11/2008 | Fu et al. |
| 2009/0179605 | A1 * | 7/2009 | Kanekawa et al. ........... 318/490 |
| 2009/0206827 | A1 * | 8/2009 | Aimuta et al. ........... 324/207.25 |
| 2010/0321006 | A1 * | 12/2010 | Suzuki ..................... 324/207.25 |
| 2013/0326888 | A1 * | 12/2013 | Ura ................. 33/1 N |
| 2013/0335070 | A1 * | 12/2013 | Abe et al. ................. 324/207.13 |
| 2014/0117980 | A1 * | 5/2014 | Ely .......................... 324/207.17 |

FOREIGN PATENT DOCUMENTS

| EP | 1 586 864 A2 | 10/2005 |
| JP | 2000-166205 A | 6/2000 |

OTHER PUBLICATIONS

Jul. 30, 2015 European Search Report issued in European Application No. 13170971.9.

* cited by examiner

*Primary Examiner* — Yaritza Guadalupe-McCall (74) *Attorney, Agent, or Firm* — Oliff PLC (57) ABSTRACT

A rotation angle detecting device includes a resolver that outputs three-phase signals based on a rotation angle of a rotary shaft, and an R/D converter that acquires the three-phase output signals via signal lines corresponding to the respective phases. The R/D converter determines the rotation angle of the rotary shaft on the basis of the three-phase output signals. The R/D converter includes switching elements that change the potential of the first-phase signal line and the potential of the second-phase signal line, respectively.

4 Claims, 7 Drawing Sheets

WHEN SWITCHING ELEMENT SW1 IS TURNED ON

| | CASE 1 | CASE 2 | CASE 3 |
|---|---|---|---|
| MEDIAN VALUE OF SECOND-PHASE DIFFERENTIAL AMPLIFICATION SIGNAL Vb' | VARIED | NOT VARIED | NOT VARIED |
| MEDIAN VALUE OF THIRD-PHASE DIFFERENTIAL AMPLIFICATION SIGNAL Vc' | NOT VARIED | VARIED | NOT VARIED |
| WHETHER THERE IS SHORT CIRCUIT | THERE IS SHORT CIRCUIT BETWEEN FIRST-PHASE SIGNAL LINE W2a AND SECOND-PHASE SIGNAL LINE W2b | THERE IS SHORT CIRCUIT BETWEEN FIRST-PHASE SIGNAL LINE W2a AND THIRD-PHASE SIGNAL LINE W2c | THERE IS NO SHORT CIRCUIT BETWEEN FIRST-PHASE SIGNAL LINE W2a AND SIGNAL LINES OF OTHER PHASES |

Fig. 3A

WHEN SWITCHING ELEMENT SW2 IS TURNED ON

| | CASE 1 | CASE 2 | CASE 3 |
|---|---|---|---|
| MEDIAN VALUE OF FIRST-PHASE DIFFERENTIAL AMPLIFICATION SIGNAL Va' | VARIED | NOT VARIED | NOT VARIED |
| MEDIAN VALUE OF THIRD-PHASE DIFFERENTIAL AMPLIFICATION SIGNAL Vc' | NOT VARIED | VARIED | NOT VARIED |
| WHETHER THERE IS SHORT CIRCUIT | THERE IS SHORT CIRCUIT BETWEEN FIRST-PHASE SIGNAL LINE W2a AND SECOND-PHASE SIGNAL LINE W2b | THERE IS SHORT CIRCUIT BETWEEN SECOND-PHASE SIGNAL LINE W2b AND THIRD-PHASE SIGNAL LINE W2c | THERE IS NO SHORT CIRCUIT BETWEEN SECOND-PHASE SIGNAL LINE W2b AND SIGNAL LINES OF OTHER PHASES |

ROTATION ANGLE DETECTING DEVICE

INCORPORATION BY REFERENCE/RELATED APPLICATION

This application claims priority to Japanese Patent Application No. 2012-132086 filed on Jun. 11, 2012 the disclosure of which, including the specification, drawings and abstract, is incorporated herein by reference in its entirety.

BACKGROUND OF THE INVENTION

1. Field of the Invention

The invention relates to a rotation angle detecting device that detects a rotation angle of a rotary shaft.

2. Discussion of Background

There is known a rotation angle detecting device of this type, which utilizes a resolver that outputs multiple-phase signals based on a rotation angle of a rotary shaft. The resolver includes a rotor that rotates together with the rotary shaft and a stator that is arranged so as to surround the rotor. The resolver includes an exciting winding and multiple-phase detecting windings. In the resolver, a magnetic field is formed by inputting an exciting signal to the exciting winding. The magnetic field is applied to the multiple-phase detecting windings, and thus, an induced voltage is generated in the detecting winding of each phase. Thus, sinusoidal signals having different phases are output from the detecting windings of the respective phases. In addition, when a magnetic field that is applied to output windings of the respective phases varies with the rotation of the rotor, an induced voltage that is generated in the detecting winding of each phase varies. Thus, the amplitude of the signal that is output from the detecting winding of each phase varies with the rotation angle of the rotor. The signal that is output from the detecting winding of each phase is input to a resolver/digital converter (R/D converter) via a signal line corresponding to each phase. The R/D converter computes the rotation angle of the rotor, that is, the rotation angle of the rotary shaft, on the basis of output signals of the respective phases.

In such a rotation angle detecting device, when a short circuit occurs in the signal lines of the respective phases, corresponding signals that are input to the R/D converter do not correspond to the rotation angle, and it is not possible to appropriately detect the rotation angle. Thus, in such a rotation angle detecting device, it is desirable to be able to detect a short circuit in the signal lines. A conventional rotation angle detecting device that includes such a short circuit detecting function is described in US2004/0017206 A1.

In the rotation angle detecting device described in US2004/0017206 A1, resistive elements are respectively provided in lines that respectively connect the detecting windings and signal lines of the respective phases of the resolver. Then, by setting the resistance values of the resistive elements corresponding to the respective phases to values different from one another, the median values of output signals that are output from the resolver to the signal lines of the respective phases are set to values different from one another. Thus, when a short circuit occurs in the signal lines of the respective phases, the median values of output signals of the respective phases, which are input to the R/D converter, vary on the basis of the locations of the short-circuit signal lines. Therefore, by monitoring the median values of output signals that are input to the R/D converter, it is possible to detect a short circuit in the signal lines.

In the rotation angle detecting device described in US2004/0017206 A1, it is necessary to provide the resistive elements in the resolver. Therefore, there is a possibility that the size of the resolver may increase.

SUMMARY OF THE INVENTION

The invention provides a rotation angle detecting device that makes it possible to avoid an increase in the size of a resolver while making it possible to detect a short circuit in signal lines of respective phases.

According to a feature of an example of the invention, in a rotation angle detecting device including a resolver that outputs signals of multiple phases based on a rotation angle of a rotary shaft, and a resolver/digital converter that acquires the signals of the multiple phases via signal lines corresponding to the respective phases and that determines the rotation angle of the rotary shaft on the basis of the signals of the multiple phases, the resolver/digital converter includes potential changing means for changing a potential of at least one of the signal lines.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

Hereinafter, embodiments of the invention will be described with reference to the accompanying drawings.

Figure 1:
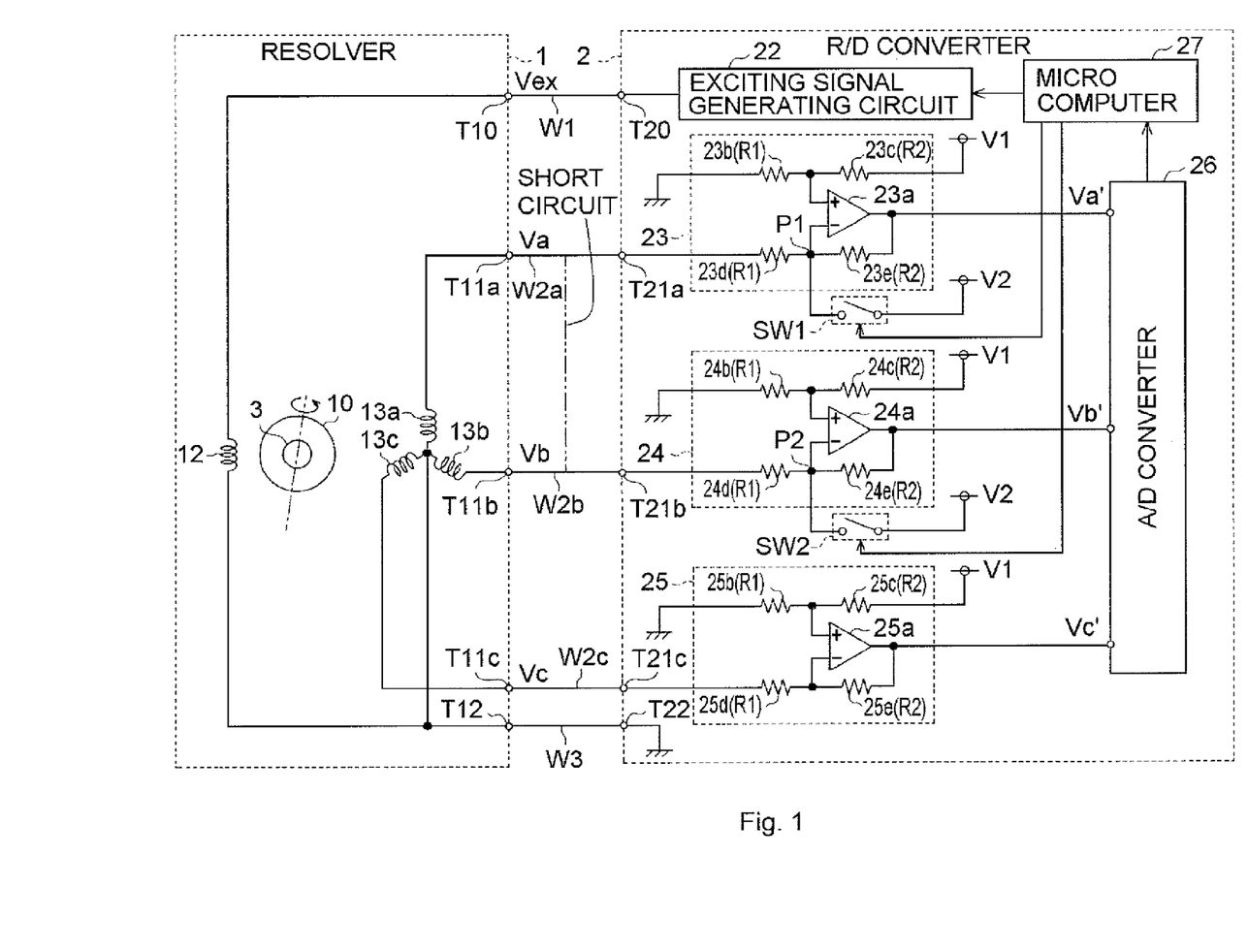
FIG. 1 is a circuit diagram that shows the circuit configuration of a rotation angle detecting device according to one embodiment of the invention.

An embodiment of the invention will be described with reference to FIG. 1 to FIG. 4. As shown in FIG. 1, a rotation angle detecting device according to the present embodiment includes a single-phase excitation three-phase output resolver 1 and a resolver/digital converter (R/D converter) 2. The resolver 1 outputs multiple-phase signals on the basis of a rotation angle of a rotary shaft 3. The R/D converter 2 converts output signals Va to Vc of the resolver 1 to angular data.

The resolver 1 includes a rotor 10 and a stator (not shown). The rotor 10 rotates together with the rotary shaft 3. The stator is arranged so as to surround the rotor 10. The stator includes an exciting winding 12 and first-phase to third-phase detecting windings 13a to 13c.

One end of the exciting winding 12 is connected to an input terminal T10 of the resolver 1. The input terminal T10 is connected to an output terminal T20 of the R/D converter 2 via an input line W1 The other end of the exciting winding 12 is connected to a ground terminal T12 of the resolver 1. The ground terminal T12 is connected to a ground terminal T22 of the R/D converter 2 via a ground line W3. The ground terminal T22 is connected to a ground line in the R/D converter 2. That is, the other end of the exciting winding 12 has a ground potential.

One ends of the first-phase to third-phase detecting windings 13a to 13c are respectively connected to the output terminals T11a to T11e of the resolver 1. The output terminals T11a to T11e are respectively connected to the input terminals T21a to T21c of the R/D converter 2 via signal lines W2a to W2c corresponding to the respective phases. The other ends of the first-phase to third-phase detecting windings 13a to 13c are connected to the ground terminal T12 of the resolver 1. That is, the other ends of the first-phase to third-phase detecting windings 13a to 13c have a ground potential.

In the resolver 1, when an exciting signal Vex consisting of alternating-current voltage is input to the exciting winding 12 via the input line W1, the exciting winding 12 generates a magnetic field. The magnetic field is applied to the three-phase detecting windings 13a to 13c through a magnetic path formed between the rotor 10 and the stator, and thus, induced voltages are respectively generated in the detecting windings 13a to 13c. Thus, sinusoidal signals Va to Vc having different phases are output from the three-phase detecting windings 13a to 13c. When the magnetic field that is applied to the three-phase detecting windings 13a to 13c varies with the rotation of the rotor 10, induced voltages that are respectively generated in the three-phase detecting windings 13a to 13c vary. Thus, the amplitudes of the signals Va to Vc that are output from the three-phase detecting windings 13a to 13c vary on the basis of the rotation angle of the rotor 10. These output signals Va to Vc are respectively input to the input terminals T21a to T21c of the R/D converter 2 via the three-phase signal lines W2a to W2c.

The R/D converter 2 includes an exciting signal generating circuit 22 and differential amplifier circuits 23 to 25. The exciting signal generating circuit 22 generates the exciting signal Vex. The differential amplifier circuits 23 to 25 amplify signals that are respectively input to the input terminals T21a to T21c.

The differential amplifier circuit 23 includes voltage dividing resistors 23b, 23c that divide a first reference voltage V1. A divided voltage value of the voltage dividing resistors 23b, 23c is input to a noninverting input terminal of an operational amplifier 23a. A signal from the input terminal T21a is input to an inverting input terminal of the operational amplifier 23a via an input resistor 23d. The operational amplifier 23a is subjected to negative feedback, and a feedback resistor 23e is provided in its negative feedback line. The voltage dividing resistor 23b and the input resistor 23d have the same resistance value R1. The voltage dividing resistor 23c and the feedback resistor 23e have the same resistance value R2. The differential amplifier circuit 23 amplifies the difference between the signal Va from the input terminal T21a and the first reference voltage V1 at an amplification factor set by the ratio between the resistance values R1, R2, and outputs the amplified difference.

Each of the differential amplifier circuits 24, 25 has a configuration similar to that of the differential amplifier circuit 23. That is, the differential amplifier circuit 24 includes an operational amplifier 24a, voltage dividing resistors 24b, 24c, an input resistor 24d and a feedback resistor 24e. The differential amplifier circuit 24 amplifies the difference between the signal Vb from the input terminal T21b and the first reference voltage V1 at an amplification factor set by the ratio between the resistance values R1, R2, and outputs the amplified difference. In addition, the differential amplifier circuit 25 includes an operational amplifier 25a, voltage dividing resistors 25b, 25c, an input resistor 25d and a feedback resistor 25e. The differential amplifier circuit 25 amplifies the difference between the signal Vc from the input terminal T21c and the first reference voltage V1 at an amplification factor set by the ratio between the resistance values R1, R2, and outputs the amplified difference.

Three-phase signals Va' to Vc', of which the differences have been respectively amplified by the differential amplifier circuits 23 to 25, are converted to digital values by an analog-to-digital converter (A/D converter) 26, and the digital values are input to a microcomputer 27. The microcomputer 27 computes the rotation angle of the rotor 10, that is, the rotation angle of the rotary shaft 3, on the basis of the input digital values. The microcomputer 27 outputs the exciting signal Vex to the input line W1 via the output terminal T20 by issuing an instruction to the exciting signal generating circuit 22.

The R/D converter 2 includes a switching element SW1 and a switching element SW2. The switching element SW1 is connected to a connection point P1 between the input resistor 23d and feedback resistor 23e of the differential amplifier circuit 23. The switching element SW2 is connected to a connection point P2 between the input resistor 24d and feedback resistor 24e of the differential amplifier circuit 24. Each of the switching elements SW1, SW2 applies or stops applying a second reference voltage V2 to a corresponding one of the connection points P1, P2 through switching on/off states thereof. In the present embodiment, when the switching element SW1 is turned on, the second reference voltage V2 is applied to the first-phase signal line W2a via the input resistor 23d. Thus, the potential of the first-phase signal line W2a is changed. In addition, when the switching element SW2 is turned on, the second reference voltage V2 is applied to the second-phase signal line W2b via the input resistor 24d. Thus, the potential of the second-phase signal line W2b is changed. In this way, in the present embodiment, the switching elements SW1, SW2 serve as potential changing means for changing the potential of the first-phase signal line W2a and the potential of the second-phase signal line W2b. Operation of switching the on/off states of each of the switching elements SW1, SW2 is controlled by the microcomputer 27.

The microcomputer 27 executes a short circuit detecting process of detecting a short circuit in the three-phase signal lines W2a to W2c at predetermined intervals. When the microcomputer 27 is not executing the short circuit detecting process, the microcomputer 27 turns off the switching elements SW1, SW2. The microcomputer 27 turns on or off the switching elements SW1, SW2 during execution of the short circuit detecting process, and monitors respective median values of the three-phase differential amplification signals Va' to Vc'. The microcomputer 27 indirectly monitors the median values of the three-phase output signals Va to Vc by monitoring the median values of the differential amplification signals Va' to Vc'. Each of the median values of the differential amplification signals Va' to Vc' is computed by, for example, sampling a value of each of the sinusoidal differential amplification signals Va' to Vc' at predetermined intervals and then determining the average of a plurality of values sampled in a set period of time. The microcomputer 27 detects a short circuit in the three-phase signal lines W2a to W2c on the basis of a variation in each of the median values of the three-phase differential amplification signals Va' to Vc' when one of the switching elements SW1, SW2 is turned on. In this way, in the present embodiment, the microcomputer 27 serves as abnormality detecting means for detecting a short circuit in the three-phase signal lines W2a to W2c.

Next, the principle of detecting a short circuit in the three-phase signal lines W2a to W2c by the microcomputer 27 will be described. For example, there may be a case where there is a short circuit between the first-phase signal line W2a and the second-phase signal line W2b as indicated by a long dashed double-short dashed line in FIG. 1. In this case, when only the switching element SW1 is turned on while the switching element SW2 remains off, the potential of the first-phase signal line W2a varies. As the potential of the first-phase signal line W2a varies, the potential of the second-phase signal line W2b that is short-circuited with the first-phase signal line W2a also varies. Therefore, the median value of the second-phase differential amplification signal Vb' varies. Thus, if the median value of the second-phase differential amplification signal Vb' varies at the time when the switching element SW1 is turned on, it can be determined that there is a short circuit between the first-phase signal line W2a and the second-phase signal line W2b.

Similarly, if the median value of the third-phase differential amplification signal Vc' varies at the time when the switching element SW1 is turned on, it can be determined that there is a short circuit between the first-phase signal line W2a and the third-phase signal line W2c. If the median value of the second-phase differential amplification signal Vb' and the median value of the third-phase differential amplification signal Vc' do not vary at the time when the switching element SW1 is turned on, it can be determined that the first-phase signal line W2a is not short-circuited with the signal lines of the other phases.

Figure 2:
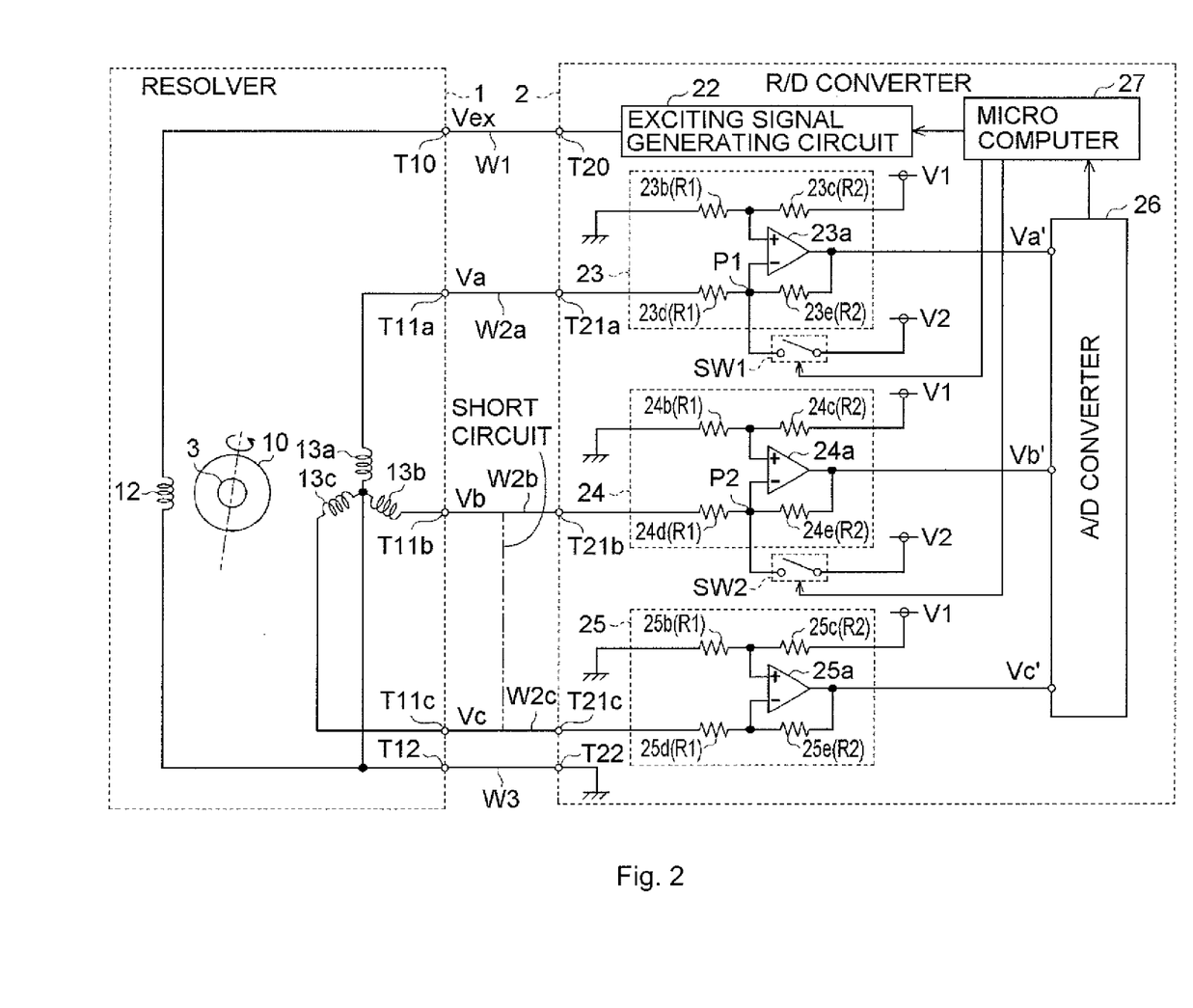
FIG. 2 is a circuit diagram for illustrating the principle of detecting a short circuit in signal lines of respective phases by the rotation angle detecting device according to the embodiment.

On the other hand, for example, there may be a case where there is a short circuit between the second-phase signal line W2b and the third-phase signal line W2c as indicated by a long dashed double-short dashed line in FIG. 2. In this case, when the switching element SW2 is turned on while the switching element SW1 remains off, the potential of the second-phase signal line W2b varies. As the potential of the second-phase signal line W2b varies, the potential of the third-phase signal line W2c that is short-circuited with the second-phase signal line W2b also varies. Therefore, the median value of the third-phase differential amplification signal Vc' varies. Thus, if the median value of the third-phase differential amplification signal Vc' varies at the time when the switching element SW2 is turned on, it can be determined that there is a short circuit between the second-phase signal line W2b and the third-phase signal line W2c.

Similarly, if the median value of the first-phase differential amplification signal Va' varies at the time when the switching element SW2 is turned on, it can be determined that there is a short circuit between the first-phase signal line W2a and the second-phase signal line W2b. If the median value of the first-phase differential amplification signal Va' and the median value of the third-phase differential amplification signal Vc' do not vary at the time when the switching element SW2 is turned on, it can be determined that the second-phase signal line W2b is not short-circuited with the signal lines of the other phases.

Figure 3A:
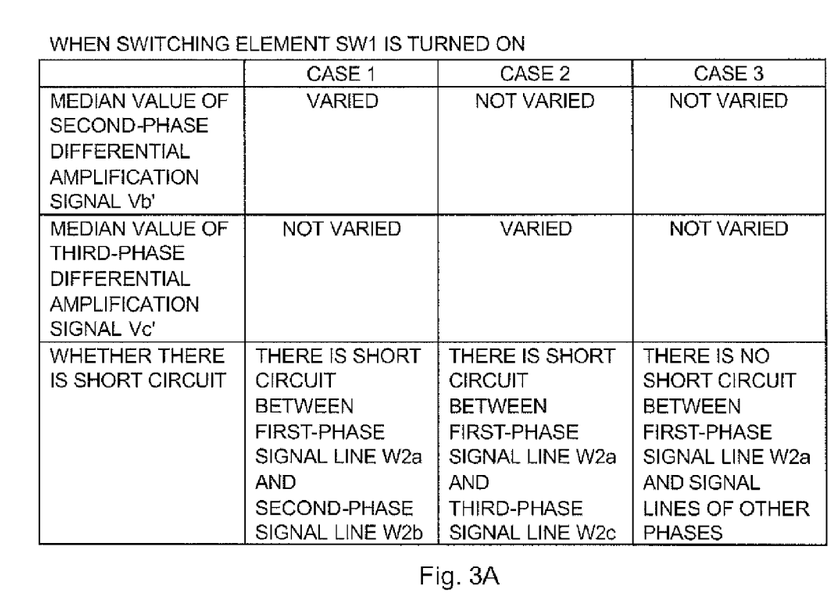
FIG. 3A and FIG. 3B are tables for illustrating the principle of detecting a short circuit in the signal lines of the respective phases by the rotation angle detecting device according to the embodiment.
Figure 3B:
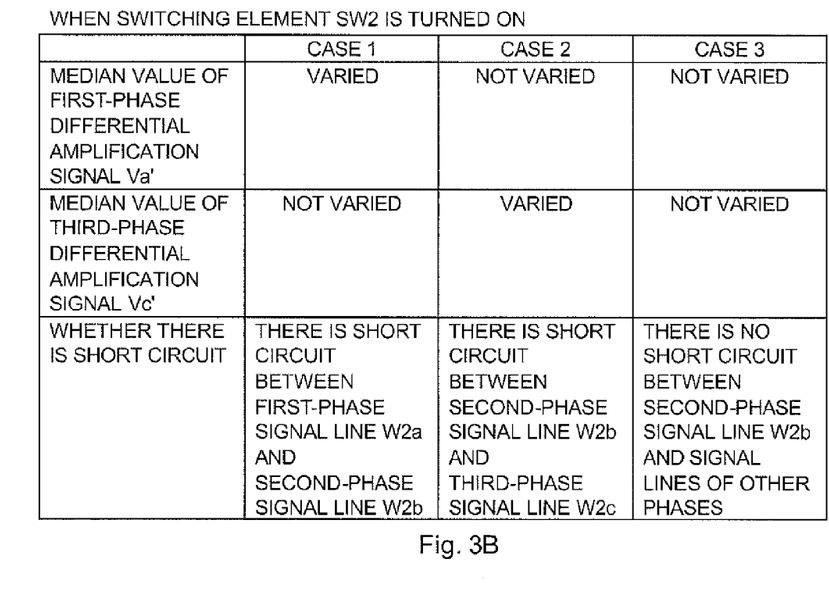

In summarizing the above, as shown in FIG. 3A and FIG. 3B, a short circuit in the three-phase signal lines W2a to W2c can be detected on the basis of a variation in each of the three-phase differential amplification signals Va' to Vc' at the time when the switching element SW1 or the switching element SW2 is turned on. One of the time when the switching element SW1 is turned on and the time when the switching element SW2 is turned on may be utilized to detect a short circuit between the first-phase signal line W2a and the second-phase signal line W2b. In addition, determination as to whether the median value of each of the three-phase differential amplification signals Va' to Vc' has varied is made through, for example, a method in which, when a differential value between a median value before the switching element SW1 or the switching element SW2 is turned on and a median value after the switching element SW1 or the switching element SW2 is turned on is larger than or equal to a predetermined value, it is determined that the median value has varied.

Next, an example of the procedure of the short circuit detecting process that utilizes the above-described principle will be described with reference to FIG. 4 together with its operation. At the time of a start of the process, the switching elements SW1, SW2 are in an off state. In addition, the microcomputer 27 executes the process shown in FIG. 4 at predetermined intervals.

Figure 4:
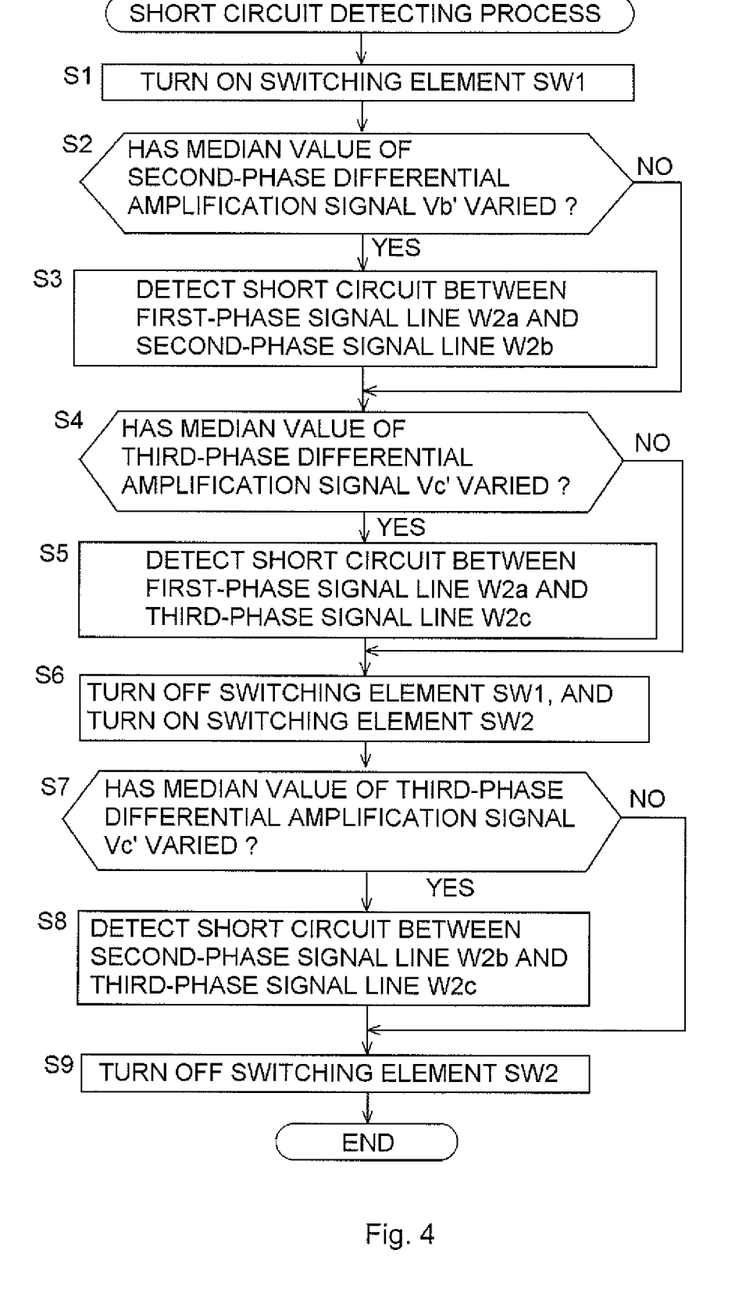
FIG. 4 is a flowchart of a short circuit detecting process that is executed by the rotation angle detecting device according to the embodiment.

As shown in FIG. 4, the microcomputer 27 initially turns on only the switching element SW1 (step S1), and determines whether the median value of the second-phase differential amplification signal Vb' has varied (step S2). When the median value of the second-phase differential amplification signal Vb' has varied (YES in step S2), the microcomputer 27 determines that there is a short circuit between the first-phase signal line W2a and the second-phase signal line W2b (step S3).

When the median value of the second-phase differential amplification signal Vb' has not varied (NO in step S2) or when the process of step S3 has been executed, the microcomputer 27 determines whether the median value of the third-phase differential amplification signal Vc' has varied (step S4). When the median value of the third-phase differential amplification signal Vc' has varied (YES in step S4), the microcomputer 27 determines that there is a short circuit between the first-phase signal line W2a and the third-phase signal line W2c (step S5).

When the median value of the third-phase differential amplification signal Vc' has not varied (NO in step S4) or when the process of step S5 has been executed, the microcomputer 27 turns off the switching element SW1, and turns on the switching element SW2 (step S6). Then, the microcomputer 27 determines whether the median value of the third-phase differential amplification signal Vc' has varied (step S7). When the median value of the third-phase differential amplification signal Yc' has varied (YES in step S7), the microcomputer 27 determines that there is a short circuit between the second-phase signal line W2b and the third-phase signal line W2c (step S8).

When the median value of the third-phase differential amplification signal Yc' has not varied (NO in step S7) or when the process of step S8 has been executed, the microcomputer 27 turns off the switching element SW2 (step S9), and ends a series of processes.

In this way, according to the present embodiment, it is possible to detect a short circuit in the three-phase signal lines W2a to W2c. In addition, it is not necessary to add a special configuration to the resolver 1 while making it possible to detect a short circuit in this way. Therefore, it is possible to avoid an increase in the size of the resolver 1.

The temperature of the resolver 1 rises at the time of detecting the rotation angle. Thus, as in the case of the rotation angle detecting device described in US2004/0017206 A1, if resistive elements are respectively provided in lines that respectively connect the three-phase detecting windings 13a to 13c and the three-phase signal lines W2a to W2c of the resolver 1, the resistance values vary with a rise in the temperature of the resolver 1. When the three-phase output signals Va to Vc of the resolver 1 vary due to the variations of the resistance values, it may not be able to appropriately detect the rotation angle of the rotary shaft 3 with the use of the R/D converter 2. In this respect, in the present embodiment, no resistive element is provided in the resolver 1, and therefore, it is possible to suppress variations in the three-phase output signals Va to Vc due to a rise in the temperature of the resolver 1. Thus, the reliability of the resolver 1 improves.

As described above, with the rotation angle detecting device according to the present embodiment, the following advantageous effects are obtained.

(1) The R/D converter 2 includes the switching element SW1 that applies or stops applying the predetermined voltage to the first-phase signal line W2a through operation of switching on/off states thereof and the switching element SW2 that applies or stops applying the predetermined voltage to the second-phase signal line W2b through operation of switching on/off states thereof, and thus, the potential of the first-phase signal line W2a and the potential of the second-phase signal line W2b are easily changed. Thus, it is possible to avoid an increase in the size of the resolver 1 while making it possible to detect a short circuit in the three-phase signal lines W2a to W2c. In comparison with the case where the resistive elements are provided in the resolver 1, it is possible to suppress variations of the three-phase output signals Va to Vc due to a rise in the temperature of the resolver 1, and therefore, the reliability of the resolver 1 improves.

(2) The microcomputer 27 changes the potential of any specified one of the first-phase signal line W2a and the second-phase signal line W2b (i.e., the potential of the signal line corresponding to any one specified phase) by switching the on/off states of the switching elements SW1, SW2. The microcomputer 27 detects a short circuit in the three-phase signal lines W2a to W2c on the basis of a variation in the signal of each phase other than the one specified phase, which is input to the R/D converter 2. Thus, it is possible to easily detect a short circuit in the three-phase signal lines W2a to W2c.

(3) The microcomputer 27 detects whether there is a variation in each of the three-phase differential amplification signals Va' to Vc' on the basis of the median value thereof. Thus, it is possible to easily detect whether there is a variation in each of signal waveforms of the differential amplification signals Va' to Vc'.

(4) The microcomputer 27 changes the potential of the first-phase signal line W2a and the second-phase signal line W2b only when the short circuit detecting process is executed. Thus, it is possible to shorten as much as possible the duration during which the potential of the first-phase signal line W2a is changed and the duration during which the potential of the second-phase signal line W2b is changed. Thus, it is possible to detect a short circuit in the three-phase signal line W2a to W2c without impairing computation of the rotation angle by the R/D converter 2 as much as possible.

(5) The R/D converter 2 includes the switching element SW1 that applies or stops applying the predetermined voltage to the first-phase signal line W2a through operation of switching on/off states thereof and the switching element SW2 that applies or stops applying the predetermined voltage to the second-phase signal line W2b through operation of switching on/off states thereof. Thus, it is possible to easily change the potential of the first-phase signal line W2a and the potential of the second-phase signal line W2b only by switching the on/off states of the switching elements SW1, SW2.

The above-described embodiment may be modified into the following embodiments.

Figure 5:
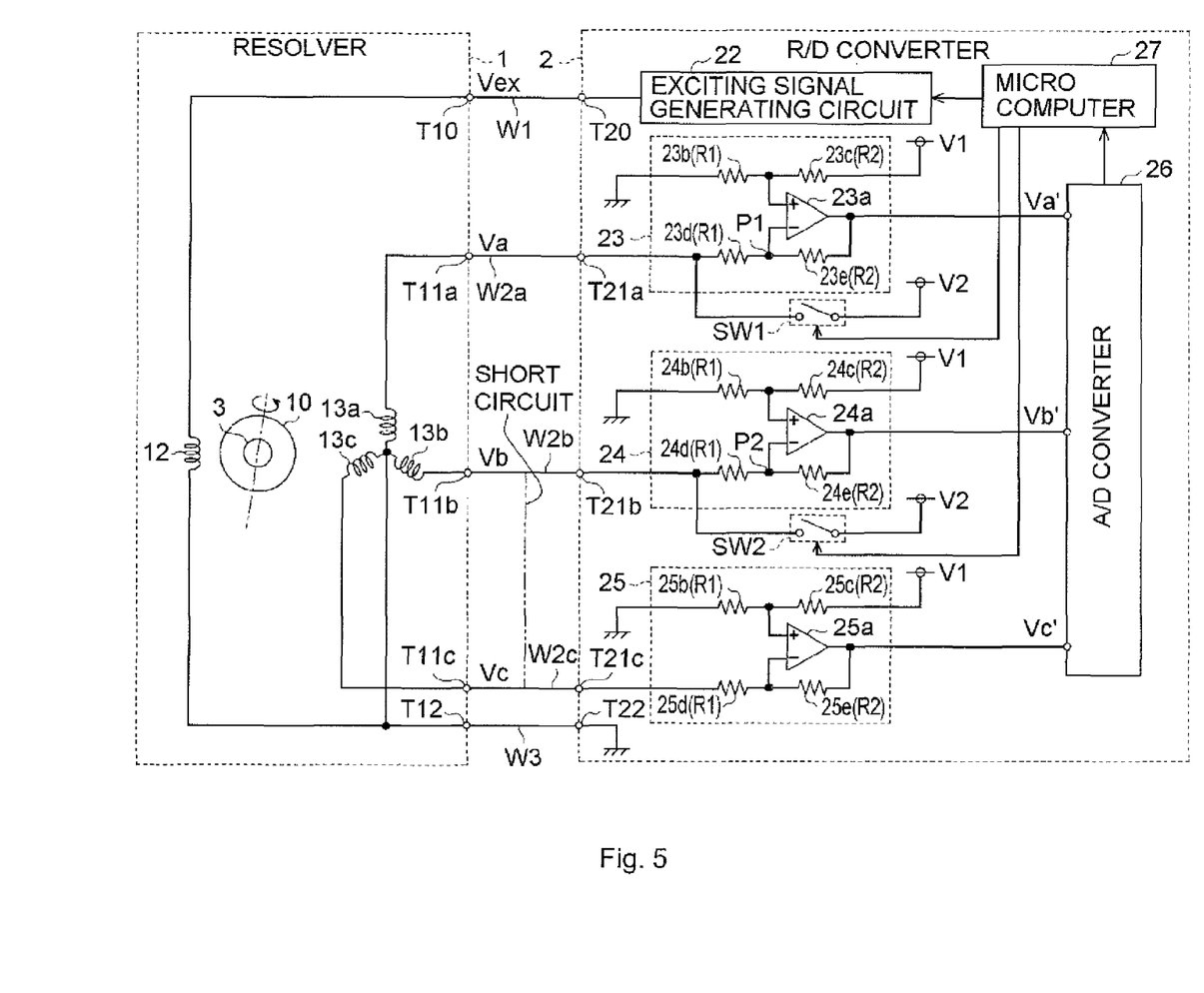
FIG. 5 is a circuit diagram that shows the circuit configuration of a rotation angle detecting device according to another embodiment of the invention.
Figure 6:
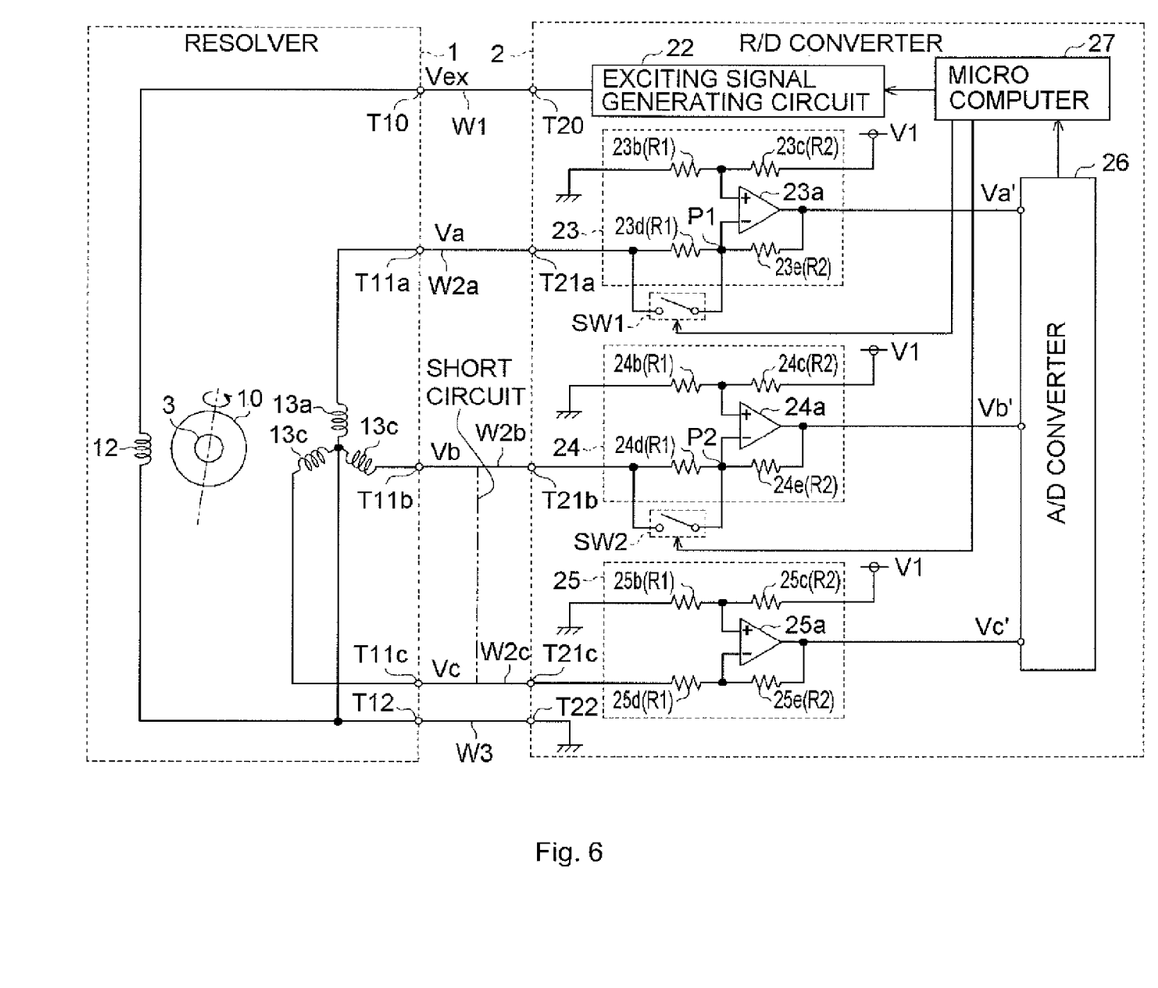
FIG. 6 is a circuit diagram that shows the circuit configuration of a rotation angle detecting device according to another embodiment of the invention.
Figure 7:
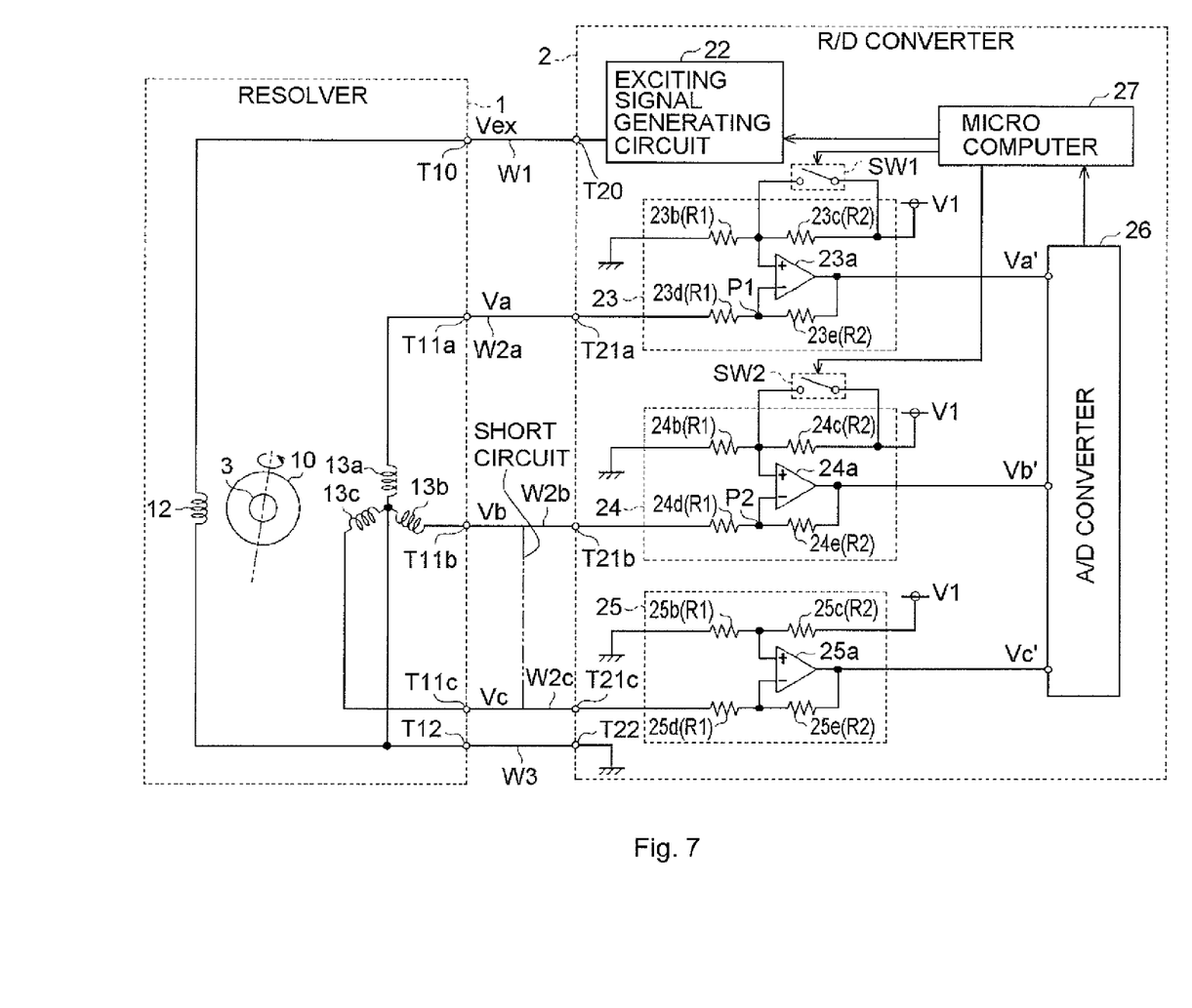
FIG. 7 is a circuit diagram that shows the circuit configuration of a rotation angle detecting device according to another embodiment of the invention.

As long as it is possible to change the potential of the first-phase signal line W2a and the potential of the second-phase signal line W2b, the locations of the switching elements SW1, SW2 may be changed as needed. For example, as shown in FIG. 5, the switching element SW1 may be connected between the input terminal T21a and the input resistor 23d and the switching element SW2 may be connected between the input terminal T21b and the input resistor 24d. In addition, as shown in FIG. 6, the switching elements SW1, SW2 may be respectively connected in parallel to the input resistors 23d, 24d. Furthermore, as shown in FIG. 7, the switching elements SW1, SW2 may be respectively connected in parallel to the voltage dividing resistors 23c, 24c. With any one of the configurations illustrated in FIG. 5 to FIG. 7, it is possible to change the potential of the first-phase signal line W2a and the potential of the second-phase signal line W2b through operation of switching on/off states of the switching elements SW1, SW2. Thus, with a method similar to the method in the above-described embodiment, it is possible to detect a short circuit in the three-phase signal lines W2a to W2c.

In the above-described embodiment, the potential of the first-phase signal line W2a and the potential of the second-phase signal line W2b are changed by the switching elements SW1, SW2. Alternatively, the potential of the second-phase signal line W2b and the potential of the third-phase signal line W2c may be changed. Also, the potential of the first-phase signal line W2a and the potential of the third-phase signal line W2c may be changed. Furthermore, another switching element may be added to make it possible to change the potentials of all the signal lines W2a to W2c. In short, it is just required to be able to change the potentials of any two of the three-phase signal lines W2a to W2c.

In the above-described embodiment, it is detected whether there is a variation in each of the three-phase differential amplification signals Va' to Vc' on the basis of the median value thereof. However, any method of detecting whether there is a variation in each one of the three-phase differential amplification signals Va' to Vc' may be employed.

In the above-described embodiment, a short circuit in the signal lines W2a to W2c is detected on the basis of a variation in each of the median values of the three-phase differential amplification signals Va' to Vc'. When there is a variation in any one of the median values of the three-phase differential amplification signals Va' to Vc', the rotation angle that is computed by the microcomputer 27 also varies. By utilizing this principle, a short circuit in the three-phase signal lines W2a to W2c may be detected on the basis of a variation in the rotation angle that is computed by the microcomputer 27 on the basis of signals from the signal lines other than the signal line of which the potential has been changed.

The interval at which the short circuit detecting process illustrated in FIG. 4 is executed may be, for example, set as follows. An electric power steering system for a vehicle includes an electric motor that applies assist torque to a steering system of the vehicle. When the electric motor is a brushless motor, a rotation angle detecting device that detects the rotation angle is provided in order to execute drive control over the electric motor. When the rotation angle detecting device in the above-described embodiment is applied to such a rotation angle detecting device, it generally takes a period of time 20 (ms) to 30 (ms) until an abnormal behavior actually appears in the electric motor after the time point at which a short circuit occurs in the three-phase signal lines W2a to W2c. Thus, in this case, when the interval at which the short circuit detecting process illustrated in FIG. 4 is executed is set to 20 (ms), it is possible to detect a short circuit in the three-phase signal lines W2a to W2c before an abnormal behavior appears in the electric motor. The interval at which the short circuit detecting process is executed is not limited to 20 (ms), and may be changed as needed.

The invention is not limited to the rotation angle detecting device that uses the single-phase excitation three-phase output resolver, and may be, for example, applied to a rotation angle detecting device that uses a single-phase excitation two-phase output resolver. In addition, the invention may also be applied to a rotation angle detecting device or a torque sensor, which includes two resolvers.

What is claimed is:

1. A rotation angle detecting device including a resolver that outputs signals of multiple phases based on a rotation angle of a rotary shaft, and a resolver/digital converter that acquires the signals of the multiple phases via signal lines corresponding to the respective phases and that determines the rotation angle of the rotary shaft on the basis of the signals of the multiple phases, wherein the resolver/digital converter includes potential changing means for changing a potential of at least one of the signal lines.

2. The rotation angle detecting device according to claim 1, further comprising abnormality detecting means for detecting a short circuit in the signal lines corresponding to the respective phases on the basis of a variation in the signal of each phase other than any one specified phase, which is input to the resolver/digital converter when the potential changing means changes the potential of the signal line corresponding to the one specified phase among the signal lines corresponding to the respective phases.

3. The rotation angle detecting device according to claim 2, wherein the abnormality detecting means executes a short circuit detecting process of detecting a short circuit in the signal lines corresponding to the respective phases at predetermined intervals, and only when the short circuit detecting process is executed, the potential changing means changes the potential of the signal line.

4. The rotation angle detecting device according to claim 1, wherein the potential changing means includes at least one switching element that applies or stops applying a predetermined voltage to the corresponding signal line through switching of on/off states of the switching element.

* * * * *